H. E. SHARP.
AUTOMOBILE TURNER.
APPLICATION FILED SEPT. 5, 1916.
1,220,028.
Patented Mar. 20, 1917.
2 SHEETS—SHEET 2.
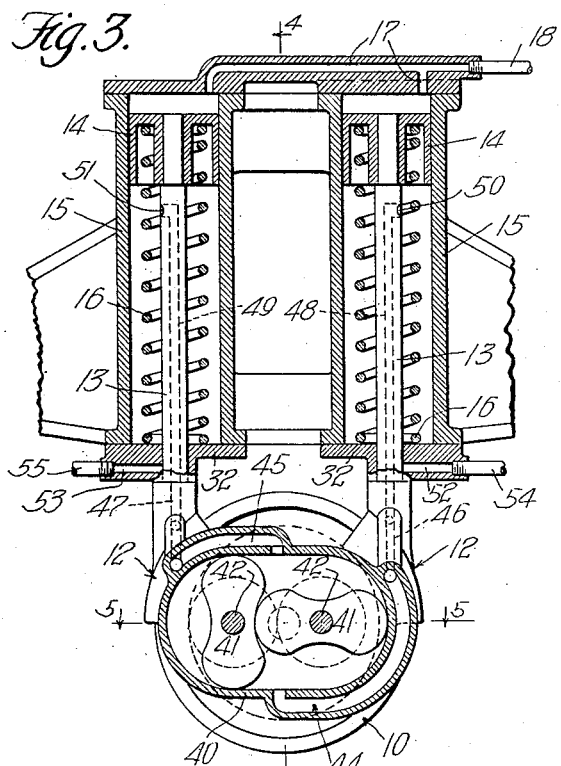
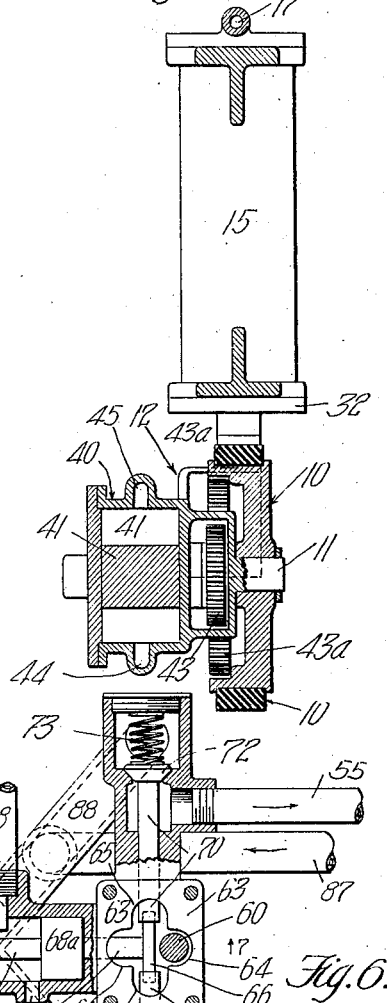
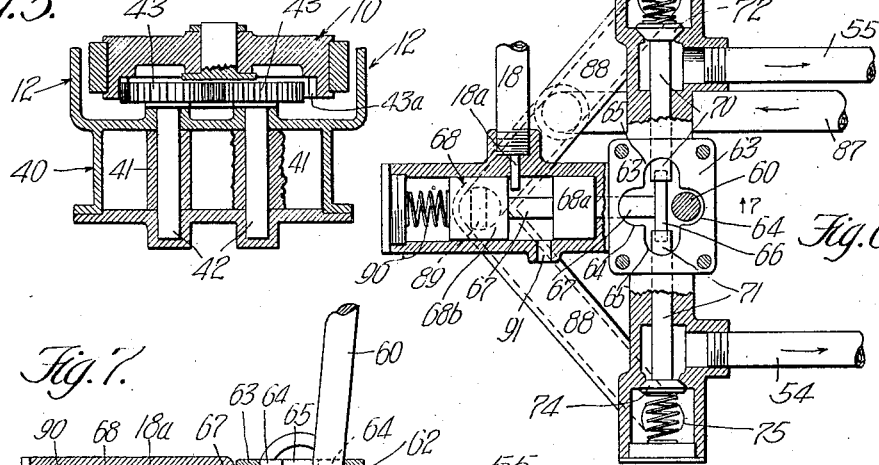
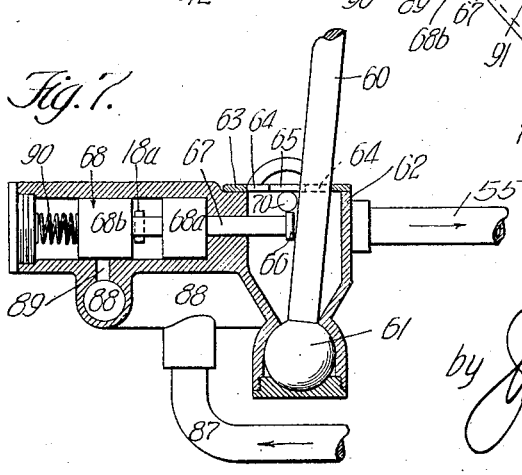
Inventor
Herbert E. Sharp,
by James T. Batchelor
his Attorney.

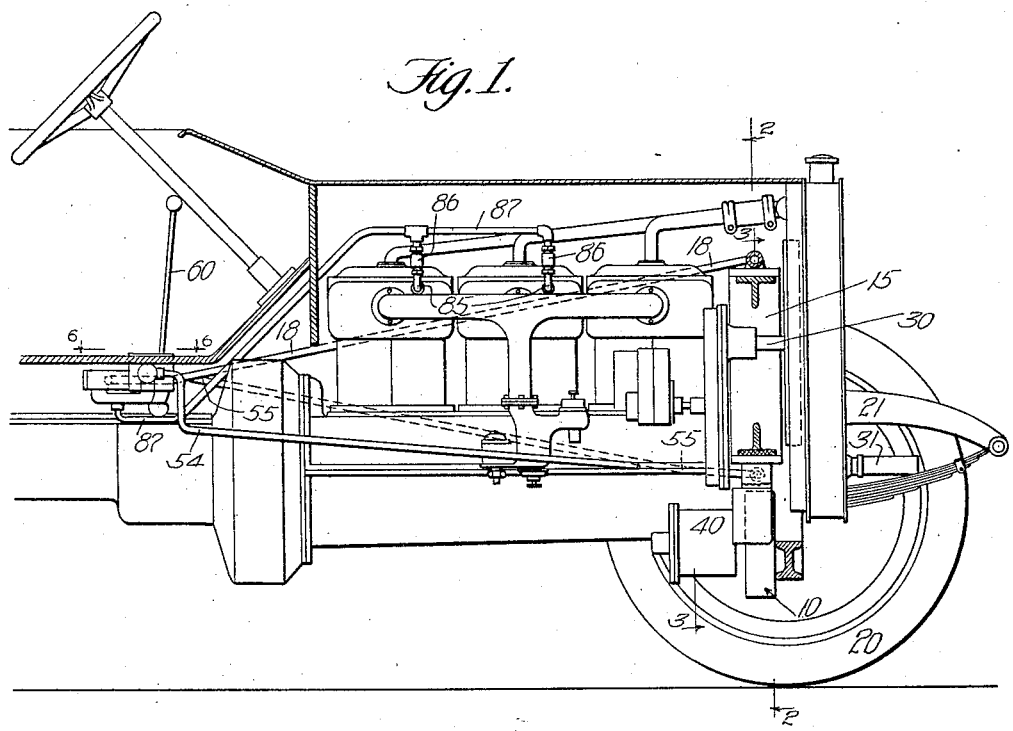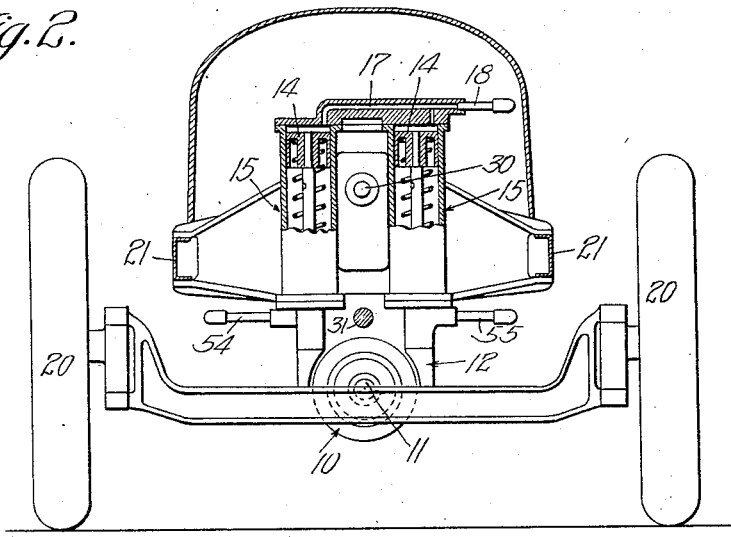

UNITED STATES PATENT OFFICE.

HERBERT E. SHARP, OF TROPICO, CALIFORNIA.

AUTOMOBILE-TURNER.

1,220,028.     Specification of Letters Patent.     Patented Mar. 20, 1917.

Application filed September 5, 1916. Serial No. 118,368.

*To all whom it may concern:*

Be it known that I, HERBERT E. SHARP, a citizen of the United States, residing at Tropico, in the county of Los Angeles, State of California, have invented new and useful Improvements in Automobile-Turners, of which the following is a specification.

This invention relates to vehicles in general, and relates in particular to automobiles. It is the object of this invention to provide a means for turning an automobile in a short radius or within a restricted space.

There are many situations in which it is desirable to turn an automobile, or move an automobile transversely, in a restricted space. For instance, where automobiles are lined up against a curb, in order to economize space, the machines are put so closely together that it is sometimes difficult to move any one machine out from the curb line; and, in order to allow fair room to move a machine in and out, each machine must have, ahead of or behind it, a space approximately equal to half of its length. Even with this space some difficulty is encountered. It is an object of my invention to overcome these difficulties and to equip an automobile with such mechanism as will enable the driver to put it into and take it out of a space of practically only its own length; to make a great saving of curb space as well as to facilitate the movement of the automobile. There are also other situations in which it is desired to turn an automobile in a restricted space, where, as for instance, on a narrow street, and particularly where there are vehicles lined up on opposite sides, it is sometimes difficult to turn a car. My invention provides the necessary means for turning the car in the smallest possible space; that is, for turning it in a space equal to its own length. And, besides overcoming these difficulties, my device is capable of other uses, such as moving the car transversely out of ruts in the roadway.

These different uses will be understood from the description of construction and operation of my device in the following specification. Also, other uses will occur to the minds of those using the device.

In the following specification I describe a preferred form of mechanism embodying my invention; but it will be understood that I do not necessarily limit myself to this particular form of device, as other forms of device may be designed embodying the principles of my invention. For instance, I have illustrated and described this preferred form of device as being operated from the engine of the automobile; but power for its operation may be had from any suitable source. The device includes generally a means to raise the automobile, or one end thereof, off the road surface and a means coöperating therewith for transversely moving the automobile, or its lifted end. In the preferred form of device, I utilize a supporting wheel which is forced down against the road surface by mechanism mounted upon or contained within the automobile; the effect being to lift the automobile and support it upon this wheel. I then employ means for rotating the wheel in either direction to cause transverse movement of the automobile in either direction.

I prefer to utilize power from the engine through the medium of fluid pressure, and preferably through the medium of gas pressure obtained from the engine cylinders. In such a mechanism I prefer to carry on all the operations by fluid pressure; that is, the operation of raising the automobile, and also the operations of moving it laterally.

Such a preferred form of device I illustrate in the accompanying drawings in which, Figure 1 is a longitudinal section of the forward end of an automobile equipped with my invention; Fig. 2 is a section showing my invention and taken as indicated by line 2—2 on Fig. 1; Fig. 3 is an enlarged section taken as indicated by line 3—3 on Fig. 1; Fig. 4 is a section taken as indicated by line 4—4 on Fig. 3; Fig. 5 is a horizontal section taken as indicated by line 5—5 on Fig. 3; Fig. 6 is a sectional view showing the controlling valves of my device taken as indicated by line 6—6 on Fig. 1; and Fig. 7 is a section taken as indicated by line 7—7 on Fig. 6.

In the drawings I show my device applied to the front end of an automobile. Although the device may be applied in other positions, yet I prefer to apply it at the front end as I find it more convenient of manipulation there and find that its operation upon the automobile is better there. For instance, where a car stands in a restricted space close to the curb, with the device at the front end, it is possible then to move the front end of the car out away from the curb far enough to clear the automobile immediately ahead and then to move out into the roadway by simply driving forward. If, on the other hand, the device were applied to the rear end of the car, after the rear end had been moved out transversely it would be necessary to first back out into the roadway and then drive forwardly.

I thus prefer to place the mechanism in the position shown. A wheel 10 is mounted upon a horizontal longitudinal axis 11 carried upon a suitable frame 12. This frame 12 is mounted upon and carried by the lower ends of piston rods 13 which carry upon their upper ends the pistons 14 in the upright cylinders 15. The pistons are normally supported in the position illustrated by springs 16. Pressure is admitted above the pistons 14 through passages 17 from pipe 18 to move the pistons downwardly. Downward movement of the pistons causes downward movement of the wheel 10; and the stroke of the pistons and their placement on the machine is such that their downward movements will carry the wheel 10 into vertical contact with the ground and will then raise the forward end of the machine far enough so that the front wheels 20 of the machines are off the ground. The cylinders 15 are rigidly mounted upon the vehicle frame 21 in any suitable manner, so as to support the wheel 10 in its proper position in a vertical plane transverse of the machine; so that when the wheel 10 is rotated it will move the front end of the machine transversely. I preferably utilize two cylinders 15 rather than one, both on account of this construction giving good support to the wheel 10 and on account of making space for the fan shaft 30 and the engine or engine-starting shaft 31. The lower ends of the cylinders are provided with heads 32 having bearings for the piston rods 13.

The frame 12, hereinbefore referred to, not only carries the wheel 10, but also carries a casing 40 housing the two rotating and intermeshing elements 41 of a suitable rotary motor. This rotary motor I prefer to make simple in character. The rotating elements 41 are mounted on shafts 42 which carry intermeshing gears 43 on their outer ends to cause the two elements to rotate synchronously. One of these gears 43 meshes with internal gear 43ª which forms an integral part of the wheel 10. The reduction of speed between the elements 41 and wheel 10 may be designed to suit conditions; it only being necessary that, with the fluid pressure available, the rotary motor shall give enough power to rotate the wheel 10 and move the front end of the automobile transversely under any road condition. Fluid pressure is admitted through either of the ports 44 or 45 to operate the rotary motor. These ports 44 and 45 connect with passages 46 and 47 which lead to the passages 48 and 49 in the piston rods 13. At the upper end of passages 48 and 49 there are openings 50 and 51 adapted to register with ports 52 and 53 when the pistons are in their lowermost positions, and when the wheel 10 has raised the automobile off the ground. Pipes 54 and 55 supply fluid pressure to ports 52 and 53. When fluid pressure is supplied through pipe 54, the rotary motor turns wheel 10 in such a direction as to move the front end of the automobile to the right; while supply of fluid pressure through pipe 55 similarly causes transverse motion of the front end of the automobile to the left. It will be noted that the rotary motor can only be operated after the wheel 10 is fully lowered, as openings 50 and 51 do not register with ports 52 and 53 until that time. Consequently, and as hereinafter explained, the first operation must be to lower the wheel 10 and then the wheel may be rotated in either direction to move the front end of the automobile in either direction. I make arrangements for manually controlling the operations of the mechanism hereinbefore described, and for preferably controlling them by movement of a single hand lever. I may mount a hand lever 60 on a ball and socket 61, in a convenient position before the driver of the automobile. A small frame work or housing 62 is provided with an upper plate 63 having a longitudinal slot 64 and opposite transverse slots 65 therein. Movement of the lever 60 rearwardly will cause the lever to engage a head 66 on a valve rod 67 and to push this valve rod rearwardly. The valve rod 67 carries a piston valve composed of two parts 68ª and 68ᵇ. This valve is moved to the right in Fig. 6 by spring 90. In its normal position this valve opens communication between the pipe 18, which leads to the top of cylinders 15, and a small port 91; causing the cylinders 15 to be normally connected to atmosphere through this port 91. When the valve is moved rearwardly to an intermediate position, the port 91 is covered. Port 89 is also covered, both in the position of the valve shown in the drawings and in its intermediate position. When the valve is pushed back to its rearward position, then the port 18ª is connected with port 89. Fluid pressure is supplied, as hereinafter explained, through the port 89; so that when the valve reaches its last mentioned position, fluid pressure flows through the pipe 18 to the cylinders 15, to cause the downward movements of the pistons therein, and to cause the front end of the car to be raised off the ground. When the front end of the car is fully raised off the ground, then the hand lever 60 is moved back to its intermediate position and may then be moved either to the left or to the right. In moving to the right or to the left, it will still engage the valve rod head 66 and will hold the valve 68 in its intermediate position; in which position the supply of fluid pressure to the cylinders 15 is cut off, and the exhaust from these cylinders is also cut off. The result is that, when the lever 60 is moved to such an intermediate position, where it can move to the left or right in the transverse slots 65, the fluid pressure is held in the cylinders 15 and the front end of the car is held up. When the lever 60 is moved to the left or right, it will engage either the valve stem 70 or the valve stem 71, still engaging the head 66, as hereinbefore stated. Engaging and pushing the valve stem 70 toward the driver's left will unseat the valve 72 and open communication between the ports 73 and pipe 55; and passage of pressure through pipe 55 operates the rotary motor to rotate the wheel 10 to move the vehicle transversely to the left. Movement of lever 60 to the right will push valve stem 71 to the right, unseating the valve 74 and opening communication from port 75 to pipe 54. Fluid pressure supplied through pipe 54 will cause operation of the rotary motor to rotate wheel 10 to move the front end of the vehicle transversely to the right. When the front end of the vehicle has been moved a sufficient distance either to the left or to the right, the lever 60 is moved back to central position and is then moved forwardly. The three valves are again seated by their springs and the operation of the rotary motor is thus cut off and the pressure is relieved from cylinders 15 through the port 91.

I prefer, in this specific structure, to obtain fluid pressure from the engine cylinders. Connection may be made at 85 to one or more of the engine cylinders and the pressure may be carried through check valves 86 to a pipe 87 which leads to the manually controlled valves. This pipe 87 may lead to passages 88 which communicate with the ports 69, 73 and 75.

A car equipped with my turning mechanism may be quickly turned in a minimum space. The car may be turned completely around, end for end, in a space equal to its own length; making the turn on its rear wheels as an axis or center. In this manner the car may be easily moved out from between cars close ahead and behind; may be easily turned in narrow roads or in any cramped position; or the car may be laterally shifted out of ruts in the road. Aside from this, my device is useful in supporting the car for repairs, such as for removing and replacing a tire. When it is desired to simply raise the car, it is only necessary to move the hand lever 60 to its rearmost position until the car is raised, and then move the lever to its intermediate position. In this position of the lever, the fluid pressure is held in the cylinders 15 and the engine may then be stopped while the car is held in a raised position. When the car is lowered, which is done by moving the lever 60 back to its normal, forward position, the fluid pressure is exhausted through the port 91. This port is of proper size to allow the escape of the fluid pressure quickly enough so that the car is lowered to normal position without delay, and yet not so quickly as to cause a shock when the car strikes the ground.

Having described a preferred form of my invention, I claim:

1. In combination with a vehicle, a vertically movable wheel mounted thereon in a vertical transverse plane, fluid pressure means to move the wheel downwardly into forcible contact with the ground surface, and fluid pressure means to rotate the wheel.

2. In combination with a vehicle, a vertical fluid pressure cylinder mounted at one end thereon, a piston in said cylinder and a piston rod extending below the cylinder, a fluid pressure motor and a supporting wheel driven thereby mounted upon the lower end of the piston rod, and means to supply fluid pressure to the cylinder and to the motor.

3. In combination with a vehicle, a vertical fluid pressure cylinder mounted at one end thereon, a piston in said cylinder and a piston rod extending below the cylinder, a fluid pressure motor and a supporting wheel driven thereby mounted upon the lower end of the piston rod, and means to supply fluid pressure to the cylinder and to the motor, said means embodying manually controlled means for causing operation of the motor in either direction at will.

4. In combination with a vehicle, a vertically movable frame, a wheel carried thereon in a vertical transverse plane, fluid pressure means to move the frame and the wheel thereon downwardly into forcible contact with the ground surface to thereby raise the vehicle, and fluid pressure operated means carried on said frame and rotatively connected with the wheel to rotate it.

5. In combination with a vehicle, a vertically movable wheel mounted thereon in a vertical transverse plane, fluid pressure means to move the wheel downwardly into forcible contact with the ground surface to thereby raise the vehicle, fluid pressure means to rotate said wheel, and means to controllably apply fluid pressure to the rotating means including means for preventing such application of fluid pressure until the wheel is lowered.

6. In combination with a vehicle, a pair of vertical cylinders, pistons therein and piston rods extending out of the lower ends of the cylinders, a frame carried on the lower ends of the piston rods, a fluid pressure motor carried on said frame, a wheel carried on said frame and rotatively connected to said motor, means to controllably apply fluid pressure to the upper ends of the cylinders, and means to controllably apply fluid pressure to the motor.

7. In combination with a vehicle, a pair of vertical cylinders, pistons therein and piston rods extending out of the lower ends of the cylinders, a frame carried on the lower ends of the piston rods, a fluid pressure motor carried on said frame, a wheel carried on said frame and rotatively connected to said motor, means to controllably apply fluid pressure to the upper ends of the cylinders, and means to controllably apply fluid pressure to the motor, said last mentioned means embodying passages leading through the piston rods and said frame to the motor, the upper ends of the passages terminating at side opening ports and there being ports in the lower parts of the cylinders with which said piston rod ports may register when the rods are lowered.

8. In combination with a vehicle, a pair of vertical cylinders, pistons therein and piston rods extending out of the lower ends of the cylinders, a frame carried on the lower ends of the piston rods, a fluid pressure motor carried on said frame, a wheel carried on said frame and rotatively connected to said motor, means to controllably apply fluid pressure to the upper ends of the cylinders, said fluid pressure motor being reversible, and means to controllably apply fluid pressure to the motor to operate it in either direction.

9. In combination with a vehicle, a pair of vertical cylinders, pistons therein and piston rods extending out of the lower ends of the cylinders, a frame carried on the lower ends of the piston rods, a fluid pressure motor carried on said frame, a wheel carried on said frame and rotatively connected to said motor, means to controllably apply fluid pressure to the upper ends of the cylinders, said fluid pressure motor being reversible, and means to controllably apply fluid pressure to the motor to operate it in either direction; said last mentioned means embodying passages leading through the piston rods and said frame to the motor in such relation to the motor that fluid pressure applied through said passages will operate the motor in opposite directions, the upper ends of the passages in the piston rods terminating in side opening ports and there being ports in the lower parts of the cylinders with which said piston rod ports may register when the rods are lowered, and means to controllably apply fluid pressure to either of said last mentioned ports.

10. In combination with a vehicle, a pair of vertical cylinders, pistons therein and piston rods extending out of the lower ends of the cylinders, a frame carried on the lower ends of the piston rods, a fluid pressure motor carried on said frame, a wheel carried on said frame and rotatively connected to said motor, means to controllably apply fluid pressure to the upper ends of the cylinders, said fluid pressure motor being reversible, and means to controllably apply fluid pressure to the motor to operate it in either direction; said last mentioned means embodying passages leading through the piston rods and said frame to the motor in such relation to the motor that fluid pressure applied through said passages will operate the motor in opposite directions, the upper ends of the passages in the piston rods terminating in side opening ports and there being ports in the lower parts of the cylinders with which said piston rod ports may register when the rods are lowered; said means to apply fluid pressure to the cylinders and said means to apply fluid pressure to the motor embodying a valve mechanism with a single operating handle and adapted in one position to supply fluid pressure to the cylinders and in either of two other positions to supply fluid pressure to one of said last mentioned ports.

In witness that I claim the foregoing I have hereunto subscribed my name this 26th day of August, 1916.

HERBERT E. SHARP.

Witnesses:
ELWOOD H. BARKELEW,
JAMES T. BARKELEW.